US012605861B1

(12) United States Patent
Chen

(10) Patent No.: US 12,605,861 B1
(45) Date of Patent: Apr. 21, 2026

(54) PREPARATION PROCESS FOR HIGH-STRENGTH PVC COMPOSITE BOARD

(71) Applicant: Dongguan Etan Management Consulting Co., Ltd, Dongguan (CN)

(72) Inventor: Hongqi Chen, Dongguan (CN)

(73) Assignee: Dongguan Etan Management Consulting Co., Ltd, Dongguan (CN)

( * ) Notice: Subject to any disclaimer, the term of this patent is extended or adjusted under 35 U.S.C. 154(b) by 0 days.

(21) Appl. No.: 19/090,090

(22) Filed: Mar. 25, 2025

(30) Foreign Application Priority Data

Dec. 20, 2024    (CN) .......................... 202411890589.7

(51) Int. Cl.
*B27N 3/00* (2006.01)
*B27N 3/28* (2006.01)
*C08J 3/20* (2006.01)

(52) U.S. Cl.
CPC ............... *B27N 3/002* (2013.01); *B27N 3/28* (2013.01); *C08J 3/203* (2013.01); *C08J 2327/06* (2013.01); *C08J 2423/28* (2013.01); *C08J 2497/02* (2013.01)

(58) Field of Classification Search
CPC .................................. B27N 3/002; B27N 3/28
See application file for complete search history.

(56) References Cited

FOREIGN PATENT DOCUMENTS

| | | | |
|---|---|---|---|
| CN | 1827680 | * | 9/2006 |
| CN | 101333321 | * | 12/2008 |
| CN | 108912527 | A | 11/2018 |
| CN | 116554664 | A | 8/2023 |
| CN | 117247634 | A | 12/2023 |
| CN | 118459949 | A | 8/2024 |
| JP | 2005154575 | A | 6/2005 |

OTHER PUBLICATIONS

Zhang Dao-hai, "Preparation and Performance of Polyvinyl Chloride/ Quaternary Ammonium Salt Antistatie Composites" vol. 35, Issue 1, Mar. 15, 2017, Whole Document.
Zhou Sh-i yi, "Soft Poly(Vinyl Choride) with Antistatic Prperty and Its Durability" vol. 25, Issue 11, Nov. 15, 2009, Whole Document.
First Office Action issued Aug. 16, 2025 for co-pending Chinese Patent Application No. 202411890589.7, 15 pages.

* cited by examiner

*Primary Examiner* — Edmund H Lee
(74) *Attorney, Agent, or Firm* — Birchwood IP

(57) ABSTRACT
The invention relates to the technical field of polyvinyl chloride, and discloses a preparation process for a high-strength PVC composite board, which comprises the following steps: blending and modifying 20-40 parts by weight of sodium phytate modified wood powder by weight and 5-15 parts by weight of cationic modified chlorinated poly-ethylene to obtain a mixture, blending the mixture with 100 parts by weight of polyvinyl chloride, 3-5 parts by weight of stabilizer and 0.8-1 part by weight of foaming agent, and extruding into sheets to obtain the high-strength PVC composite board.

7 Claims, No Drawings

PREPARATION PROCESS FOR HIGH-STRENGTH PVC COMPOSITE BOARD

CROSS-REFERENCE TO RELATED APPLICATIONS

This application claims priority to Chinese Patent Application No. 202411890589.7, filed on Dec. 20, 2024, which is hereby incorporated by reference in its entirety.

TECHNICAL FIELD

The invention relates to the technical field of polyvinyl chloride, in particular to a preparation process for a high-strength PVC composite board.

BACKGROUND

Polyvinyl chloride (PVC) is the third most-produced synthetic polymer plastic in the world. Blending PVC with wood powder can yield environmentally friendly and high-performance wood-plastic materials, which are widely used in furniture, decorative panels, signage, pet houses and other applications. Traditional PVC wood-plastic materials suffer from issues such as poor mechanical properties and insufficient antistatic effects.

Improving the compatibility between wood powder and polyvinyl chloride (PVC) can enhance the mechanical strength of wood-plastic materials. This is typically achieved by adding compatibilizers or modifying the wood powder with coupling agents. Adding antistatic agents such as quaternary ammonium salts into PVC can improve its antistatic properties. A cold-resistant, flame-retardant antistatic PVC sheath material for a coal mine cable, which discloses a composite high-concentration antistatic agent composed of quaternary ammonium cationic surfactants and nonionic surfactants, thereby enhancing the antistatic performance of the PVC material. However, traditional small-molecule quaternary ammonium antistatic agents tend to migrate and separate from the material matrix during long-term use, leading to a decline in the antistatic performance of the material.

SUMMARY (I) Technical problems solved: The invention solves the problems of low mechanical strength and poor antistatic performance of wood powder-PVC composite board.

(II) Technical proposal: a preparation process for a high-strength PVC composite board comprises the following steps: adding 20-40 parts by weight of sodium phytate modified wood powder and 5-15 parts by weight of cationic modified chlorinated polyethylene into a mixer, performing blending modification for 1-3 hours at 80-100 degrees C., then adding 100 parts by weight of polyvinyl chloride, 3-5 parts by weight of stabilizer, 2-5 parts by weight of plasticizer, 0.4-0.8 part by weight of lubricant, 1.5-2.2 parts by weight of auxiliary agent, 5-20 parts by weight of filler, 0.8-1 part by weight of foaming agent and 2-2.8 parts by weight of blowing promoter, blending for 20-40 minutes, and extruding the mixture into sheets from an extruder at the temperature of 140-180 degrees C. in zones 1-5 and at the screw speed of 30-50 r/min to obtain the high-strength PVC composite board.

Further, the stabilizer is a calcium-zinc stabilizer. The plasticizer is dioctyl phthalate. The lubricant is stearic acid. The auxiliary agent is polyethylene wax. The filler is calcium carbonate. The foaming agent is azodicarbonamide. The blowing promoter is an ACR foaming regulator.

Further, the preparation process for the sodium phytate modified wood powder comprises the following steps: adding 100 parts by weight of dried wood powder into N,N-dimethylformamide, adding 30-60 parts by weight of phytic acid and 3.5-7 parts by weight of urea after ultrasonic dispersion, heating to 55-75 degrees C., stirring to react for 2-4 hours, filtering and washing with ethanol, then adding the mixture into an aqueous sodium hydroxide solution, stirring for 0.5-1 hour, filtering, washing, and drying to obtain the sodium phytate modified wood powder.

Further, the preparation process for the cationic modified chlorinated polyethylene comprises the following steps: adding 20-45 parts by weight of tertiary amine monomer into isopropanol, dropwise adding concentrated hydrochloric acid solution, stirring and then adding 100 parts by weight of GMA-grafted chlorinated polyethylene, heating to 80-85 degrees C., and stirring to react for 6-12 hours, carrying out reflux condensation during reaction, and carrying out reduced pressure distillation after reaction, washing with ethanol, and drying to obtain the cationic modified chlorinated polyethylene.

Further, the tertiary amine monomer is any of trimethylamine, triethylamine, N,N-dimethylethylamine, N,N-dimethylpropylamine and N,N-dimethylbutylamine.

(III) Technical effects: The invention utilizes the quaternization reaction between tertiary amine hydrochlorides such as trimethylamine hydrochloride and epoxy groups of GMA-grafted chlorinated polyethylene to obtain cationic modified chlorinated polyethylene, thereby introducing a large number of quaternary ammonium groups onto side chains of chlorinated polyethylene. The invention uses phytic acid and urea for surface modification of the wood powder to obtain sodium phytate modified wood powder, then the sodium phytate modified wood powder is blended with the plasticizer, the foaming agent, the lubricant and polyvinyl chloride to obtain the high-strength PVC composite board. The cationic modified chlorinated polyethylene contains a large number of hydrophilic quaternary ammonium cation groups, which can adsorb water molecules from the air to form a conductive water molecule film on the surface of the PVC board, thereby increasing the PVC surface conductivity, reducing the surface resistance and improving the antistatic property. Moreover, the cationic modified chlorinated polyethylene acts as a macromolecular polymeric antistatic agent, which is less prone to migration and separation from the PVC board; even after rinsing, the PVC board maintains a very low surface resistance, demonstrating excellent antistatic property.

After surface modification with sodium phytate, the wood powder of the invention exhibits improved dispersibility in polyvinyl chloride (PVC). Additionally, the cationic modified chlorinated polyethylene contains quaternary ammonium cations, which can interact with sodium phytate anions on the surface of the wood powder, so that the cationic modified chlorinated polyethylene acts as a compatibilizer to further enhance the compatibility between the wood powder and PVC. The resulting PVC board has better tensile strength and impact strength. Moreover, the sodium phytate structure on the surface of the wood powder contains a large number of phosphate flame-retardant groups, improving the limit oxygen index and flame retardancy of the PVC board.

DESCRIPTION OF EMBODIMENTS

In the invention, both polyvinyl chloride and chlorinated polyethylene are produced by Tianjin Dagu Chemical Co., Ltd. Wood powder is poplar powder with an average particle size of 400 μm. The average particle size of calcium carbonate is 200 nm. ACR foaming regulator is G200 ACR foaming regulator produced by Shandong Sanyi Group Co., Ltd. Calcium-zinc stabilizer is produced by Guangdong Keli New Material Co., Ltd.

Add 100 g of chlorinated polyethylene, 46 g of glycidyl methacrylate (GMA) and 2.2 g of benzoyl peroxide to 300 mL of ethyl acetate, stir the mixture in a nitrogen atmosphere for 30 minutes, then add 100 mL of tert-butyl alcohol and 2 L of water, heat to 80 degrees C., allow the reaction to proceed for 8 hours, extract the filtered product in a Soxhlet extractor using acetone, and dry the product to obtain GMA-grafted chlorinated polyethylene.

Embodiment 1: (1) Add 100 g of dried wood powder to N,N-dimethylformamide, perform ultrasonic dispersion and then add 45 g of phytic acid and 5.2 g of urea, heat the mixture to 70 degrees C., stir and react for 4 hours, filter and then wash the mixture with ethanol, then add the mixture to 2 L of aqueous sodium hydroxide solution with a mass fraction of 10%, stir for 0.5 hour, filter, wash and dry to obtain sodium phytate modified wood powder.

(2) Add 100 g of trimethylamine to 5 L of isopropanol, dropwise add 150 mL of concentrated hydrochloric acid solution (with molar concentration of 12 mol/L), stir and then add 500 g of GMA-grafted chlorinated polyethylene, heat to 85 degrees C., stir and react for 6 hours, carry out reflux condensation during reaction, and carry out reduced pressure distillation after reaction, wash with ethanol, and dry to obtain the cationic modified chlorinated polyethylene.

(3) Add 2 kg of sodium phytate modified wood powder and 0.5 kg of cationic modified chlorinated polyethylene to a high-speed mixer, perform blending modification for 2 hours at 90 degrees C., then add 10 kg of polyvinyl chloride, 0.5 kg of calcium-zinc stabilizer, 0.2 kg of plasticizer dioctyl phthalate, 60 g of lubricant stearic acid, 0.15 kg of auxiliary agent polyethylene wax, 0.5 kg of filler calcium carbonate, 90 g of foaming agent azodicarbonamide and 0.28 kg of ACR foaming regulator, blend for 40 minutes, and extrude the mixture into sheets from a twin-screw extruder at the temperature of 140, 165, 180, 180 and 170 degrees C. in zones 1-5 and at the screw speed of 50 r/min to obtain the high-strength PVC composite board.

Embodiment 2: (1) Add 100 g of dried wood powder to N,N-dimethylformamide, perform ultrasonic dispersion and then add 60 g of phytic acid and 7 g of urea, heat the mixture to 55 degrees C., stir and react for 4 hours, filter and then wash the mixture with ethanol, then add the mixture to aqueous sodium hydroxide solution with a mass fraction of 5%, stir for 0.5 hour, filter, wash and dry to obtain sodium phytate modified wood powder.

(2) Add 210 g of triethylamine to 8 L of isopropanol, dropwise add 190 mL of concentrated hydrochloric acid solution (with molar concentration of 12 mol/L), stir and then add 500 g of GMA-grafted chlorinated polyethylene, heat to 80 degrees C., stir and react for 12 hours, carry out reflux condensation during reaction, and carry out reduced pressure distillation after reaction, wash with ethanol, and dry to obtain the cationic modified chlorinated polyethylene.

(3) Add 3 kg of sodium phytate modified wood powder and 1 kg of cationic modified chlorinated polyethylene to a high-speed mixer, perform blending modification for 1 hour at 100 degrees C., then add 10 kg of polyvinyl chloride, 0.3 kg of calcium-zinc stabilizer, 0.3 kg of plasticizer dioctyl phthalate, 80 g of lubricant stearic acid, 0.22 kg of auxiliary agent polyethylene wax, 1.2 kg of filler calcium carbonate, 100 g of foaming agent azodicarbonamide and 0.28 kg of ACR foaming regulator, blend for 20 minutes, and extrude the mixture into sheets from a twin-screw extruder at the temperature of 140, 165, 180, 180 and 170 degrees C. in zones 1-5 and at the screw speed of 30 r/min to obtain the high-strength PVC composite board.

Embodiment 3: (1) Add 100 g of dried wood powder to N,N-dimethylformamide, perform ultrasonic dispersion and then add 30 g of phytic acid and 3.5 g of urea, heat the mixture to 75 degrees C., stir and react for 2 hours, filter and then wash the mixture with ethanol, then add the mixture to aqueous sodium hydroxide solution with a mass fraction of 8%, stir for 1 hour, filter, wash and dry to obtain sodium phytate modified wood powder.

(2) Add 225 g of N,N-dimethylbutylamine to 8 L of isopropanol, dropwise add 200 mL of concentrated hydrochloric acid solution (with molar concentration of 12 mol/L), stir and then add 500 g of GMA-grafted chlorinated polyethylene, heat to 85 degrees C., stir and react for 10 hours, carry out reflux condensation during reaction, and carry out reduced pressure distillation after reaction, wash with ethanol, and dry to obtain the cationic modified chlorinated polyethylene.

(3) Add 4 kg of sodium phytate modified wood powder and 1.5 kg of cationic modified chlorinated polyethylene to a high-speed mixer, perform blending modification for 3 hours at 80 degrees C., then add 10 kg of polyvinyl chloride, 0.4 kg of calcium-zinc stabilizer, 0.5 kg of plasticizer dioctyl phthalate, 40 g of lubricant stearic acid, 0.15 kg of auxiliary agent polyethylene wax, 2 kg of filler calcium carbonate, 100 g of foaming agent azodicarbonamide and 0.2 kg of ACR foaming regulator, blend for 40 minutes, and extrude the mixture into sheets from a twin-screw extruder at the temperature of 140, 165, 180, 180 and 170 degrees C. in zones 1-5 and at the screw speed of 30 r/min to obtain the high-strength PVC composite board.

Comparative Example 1: (1) Add 2 kg of wood powder and 0.5 kg of cationic modified chlorinated polyethylene (prepared in Embodiment 1) to a high-speed mixer, perform blending modification for 2 hours at 90 degrees C., then add 10 kg of polyvinyl chloride, 0.5 kg of calcium-zinc stabilizer, 0.2 kg of plasticizer dioctyl phthalate, 60 g of lubricant stearic acid, 0.15 kg of auxiliary agent polyethylene wax, 0.5 kg of filler calcium carbonate, 90 g of foaming agent azodicarbonamide and 0.28 kg of ACR foaming regulator, blend for 40 minutes, and extrude the mixture into sheets from a twin-screw extruder at the temperature of 140, 165, 180, 180 and 170 degrees C. in zones 1-5 and at the screw speed of 50 r/min to obtain the high-strength PVC composite board.

Comparative Example 2: (1) Add 2 kg of sodium phytate wood powder (prepared in Embodiment 1) and 0.5 kg of chlorinated polyethylene to a high-speed mixer, perform blending modification for 2 hours at 90 degrees C., then add 10 kg of polyvinyl chloride, 0.5 kg of calcium-zinc stabilizer, 0.2 kg of plasticizer dioctyl phthalate, 60 g of lubricant stearic acid, 0.15 kg of auxiliary agent polyethylene wax, 0.5 kg of filler calcium carbonate, 90 g of foaming agent azodicarbonamide and 0.28 kg of ACR foaming regulator, blend for 40 minutes, and extrude the mixture into sheets from a twin-screw extruder at the temperature of 140, 165, 180, 180 and 170 degrees C. in zones 1-5 and at the screw speed of 50 r/min to obtain the high-strength PVC composite board.

Comparative Example 3: (1) Add 2 kg of sodium phytate wood powder (prepared in Embodiment 1) and 0.5 kg of GMA-grafted chlorinated polyethylene to a high-speed mixer, perform blending modification for 2 hours at 90 degrees C., then add 10 kg of polyvinyl chloride, 0.5 kg of calcium-zinc stabilizer, 0.2 kg of plasticizer dioctyl phthalate, 60 g of lubricant stearic acid, 0.15 kg of auxiliary agent polyethylene wax, 0.5 kg of filler calcium carbonate, 90 g of foaming agent azodicarbonamide and 0.28 kg of ACR foaming regulator, blend for 40 minutes, and extrude the mixture into sheets from a twin-screw extruder at the temperature of 140, 165, 180, 180 and 170 degrees C. in zones 1-5 and at the screw speed of 50 r/min to obtain the high-strength PVC composite board.

Comparative Example 4: (1) Add 2 kg of sodium phytate modified wood powder (prepared in Embodiment 1) and 0.5 kg of antistatic agent dodecyl trimethyl ammonium bromide to a high-speed mixer, perform blending modification for 2 hours at 90 degrees C., then add 10 kg of polyvinyl chloride, 0.5 kg of calcium-zinc stabilizer, 0.2 kg of plasticizer dioctyl phthalate, 60 g of lubricant stearic acid, 0.15 kg of auxiliary agent polyethylene wax, 0.5 kg of filler calcium carbonate, 90 g of foaming agent azodicarbonamide and 0.28 kg of ACR foaming regulator, blend for 40 minutes, and extrude the mixture into sheets from a twin-screw extruder at the temperature of 140, 165, 180, 180 and 170 degrees C. in zones 1-5 and at the screw speed of 50 r/min to obtain the high-strength PVC composite board.

The tensile property of the PVC composite board was measured according to GB/T 1040.1-2018 standard. The IZOD notched impact strength was tested according to GB/T 1843-2008 standard. The oxygen index and the flame retardancy were tested according to GB/T 2406.1-2008 standard.

The surface resistance of the PVC composite board was tested according to GB/T 1410-2006 standard. The PVC composite board was rinsed in distilled water for 72 hours, with the water changed every 12 hours, at a water temperature of 25° C. After rinsing and drying, the surface resistance was measured.

TABLE 1

| | Test Results | | |
| --- | --- | --- | --- |
| | Tensile strength (MPa) | Impact strength (kJ/m²) | Limit oxygen index (%) |
| Embodiment 1 | 24.4 | 8.95 | 28.5 |
| Embodiment 2 | 33.6 | 14.3 | 30.2 |
| Embodiment 3 | 30.4 | 15.1 | 30.9 |
| Comparative Example 1 | 18.6 | 6.57 | 26.2 |
| Comparative Example 2 | 21.2 | 7.10 | 28.3 |
| Comparative Example 3 | 21.8 | 7.15 | 28.0 |
| Comparative Example 4 | 23.9 | 8.41 | 27.7 |

TABLE 2

| | Test Results | |
| --- | --- | --- |
| | Surface resistance (Ω) | |
| | Before rinsing | After rinsing |
| Embodiment 1 | $2.450 \times 10^{12}$ | $2.479 \times 10^{12}$ |
| Embodiment 2 | $4.237 \times 10^{11}$ | $4.271 \times 10^{11}$ |
| Embodiment 3 | $5.341 \times 10^{9}$ | $5.369 \times 10^{9}$ |
| Comparative Example 1 | $2.883 \times 10^{12}$ | $2.916 \times 10^{12}$ |
| Comparative Example 2 | $7.562 \times 10^{12}$ | $7.584 \times 10^{12}$ |
| Comparative | $7.510 \times 10^{12}$ | $7.537 \times 10^{12}$ |

6

TABLE 2-continued

| | Test Results | |
| --- | --- | --- |
| | Surface resistance (Ω) | |
| | Before rinsing | After rinsing |
| Example 3 Comparative Example 4 | $1.685 \times 10^{12}$ | $2.208 \times 10^{12}$ |

As shown in the tables above, the PVC composite boards in Embodiments 1-3 are characterized by high tensile strength, high impact strength, high limit oxygen index and low surface resistance and show excellent mechanical strength, flame retardancy and antistatic property. This is because the added cationic modified chlorinated polyethylene contains a large number of hydrophilic quaternary ammonium cation groups, which can adsorb water molecules from the air and form a conductive water molecule film on the surface of the PVC board, thereby increasing the PVC surface conductivity, reducing the surface resistance and improving the antistatic property. Moreover, the cationic modified chlorinated polyethylene acts as a macromolecular polymeric antistatic agent, which is less prone to migration and separation from the PVC board; even after rinsing, the PVC board maintains a very low surface resistance, demonstrating excellent antistatic property. After surface modification with sodium phytate, the wood powder exhibits improved dispersibility in polyvinyl chloride (PVC). Additionally, the cationic modified chlorinated polyethylene contains quaternary ammonium cations, which can interact with sodium phytate anions on the surface of the wood powder, so that the cationic modified chlorinated polyethylene acts as a compatibilizer to further enhance the compatibility between the wood powder and PVC. The resulting PVC board has better tensile strength and impact strength. Moreover, the sodium phytate structure on the surface of the wood powder contains a large number of phosphate flame-retardant groups, improving the limit oxygen index and flame retardancy of the PVC board.

In Comparative Example 1, the wood powder was not surface-modified with sodium phytate. As a result, the PVC board exhibited lower limiting oxygen index and poorer flame retardancy, and could not interact with the quaternary ammonium groups of the cationic modified chlorinated polyethylene; the compatibility between the wood powder and the polyvinyl chloride was poor, resulting in low tensile strength and impact strength of the PVC board. Moreover, the surface resistance of Comparative Example 1 was higher than that of Embodiment 1. This is likely because the wood powder in Embodiment 1 could improve the hydrophilicity of the PVC board after being modified with hydrophilic sodium phytate and added into the PVC board, thus reducing the surface resistance and enhancing the antistatic property.

In Comparative Examples 2 and 3, the chlorinated polyethylene and GMA-grafted chlorinated polyethylene added did not contain quaternary ammonium antistatic groups. As a result, the PVC board exhibited high surface resistance and poor antistatic property. Additionally, these materials could not interact with the sodium phytate on the wood powder, failing to improve the compatibility between the wood powder and polyvinyl chloride. Consequently, the PVC board showed low tensile strength and impact strength.

In Comparative Example 4, the antistatic agent dodecyl trimethyl ammonium bromide was added, resulting in low surface resistance and good antistatic property of the PVC board. However, since dodecyl trimethyl ammonium bromide is small-molecule, it is prone to migration and separation from the surface of the PVC board after prolonged rinsing, leading to a significant increase in the surface resistance of the PVC board and a deterioration of antistatic property.

The embodiments described above are only several embodiments of the invention, and the descriptions are relatively specific and detailed. However, they shall not be construed as limitations to the scope of the invention. It should be noted that those of ordinary skill in the art may make various modifications and improvements without departing from the concept of the invention, all of which fall within the protection scope of the invention. Therefore, the scope of protection of the invention shall be defined by the appended claims.

What is claimed is:

1. A preparation process for a high-strength PVC composite board, characterized by comprising the following steps:

step 1: adding 20-40 parts by weight of sodium phytate modified wood powder and 5-15 parts by weight of cationic modified chlorinated polyethylene into a mixer for blending modification to obtain a first mixture, step 2: then adding 100 parts by weight of polyvinyl chloride, 3-5 parts by weight of stabilizer, 2-5 parts by weight of plasticizer, 0.4-0.8 part by weight of lubricant, 1.5-2.2 parts by weight of polyethylene wax, 5-20 parts by weight of filler, 0.8-1 part by weight of foaming agent and 2-2.8 parts by weight of blowing promoter to the first mixture to obtain a second mixture, and step 3: then extruding the second mixture into sheets from an extruder to obtain the high-strength PVC composite board;

wherein the step 1 comprises the following steps: adding 20-45 parts by weight of tertiary amine monomer into isopropanol, dropwise adding concentrated hydrochloric acid solution, stirring and then adding 100 parts by weight of GMA-grafted chlorinated polyethylene, heating to 80-85 degrees C., and stirring to react for 6-12 hours, carrying out reflux condensation during reaction, and carrying out reduced pressure distillation after reaction, washing with ethanol, and drying to obtain the cationic modified chlorinated polyethylene;

wherein the tertiary amine monomer is one of trimethylamine, triethylamine, N,N-dimethylethylamine, N,N-dimethylpropylamine and N,N-dimethylbutylamine.

2. The preparation process for the high-strength PVC composite board according to claim 1, characterized in that the stabilizer is a calcium-zinc stabilizer, and the plasticizer is dioctyl phthalate.

3. The preparation process for the high-strength PVC composite board according to claim 1, characterized in that the lubricant is stearic acid and the filler is calcium carbonate.

4. The preparation process for the high-strength PVC composite board according to claim 1, characterized in that the foaming agent is azodicarbonamide.

5. The preparation process for the high-strength PVC composite board according to claim 1, characterized in that the temperature for blending modification is 80-100 degrees C., and the time is 1-3 hours.

6. The preparation process for the high-strength PVC composite board according to claim 1, characterized in that the temperature of a twin-screw extruder is 140-180 degrees C., and the screw speed is 30-50 r/min.

7. The preparation process for the high-strength PVC composite board according to claim 1, characterized in that the step 1 further comprises the following steps:

adding 100 parts by weight of dried wood powder into N,N-dimethylformamide to obtain a third mixture, adding 30-60 parts by weight of phytic acid and 3.5-7 parts by weight of urea after ultrasonic dispersion to the third mixture to obtain a fourth mixture, heating to 55-75 degrees C., stirring to react for 2-4 hours, filtering and washing with ethanol, then adding the fourth mixture into an aqueous sodium hydroxide solution, stirring for 0.5-1 hour, filtering, washing, and drying to obtain the sodium phytate modified wood powder.

* * * * *